United States Patent [19]
Kaminski

[11] Patent Number: 4,554,667
[45] Date of Patent: Nov. 19, 1985

[54] SEALED-OFF $CO_2$ LASER

[75] Inventor: Walter R. Kaminski, North Palm Beach, Fla.

[73] Assignee: United Technologies Corporation, Hartford, Conn.

[21] Appl. No.: 546,134

[22] Filed: Oct. 27, 1983

Related U.S. Application Data

[63] Continuation-in-part of Ser. No. 256,282, Apr. 23, 1981, abandoned.

[51] Int. Cl.[4] .......................... H01S 3/02; H01S 3/097
[52] U.S. Cl. ........................................ 372/83; 372/86; 372/87
[58] Field of Search .................. 372/83, 85, 86, 87, 372/88

[56]  References Cited

U.S. PATENT DOCUMENTS 4,088,965  5/1978  Landerslager et al. ............... 372/87

OTHER PUBLICATIONS

Rebhan et al, "A High Power $N_2$-Laser of Long Pulse Duration", *Appl. Phys.* 23, No. 4, Dec. 1980, pp. 341-344.

*Primary Examiner*—James W. Davie
*Attorney, Agent, or Firm*—Eric W. Petraske

[57]  ABSTRACT

A sealed-off $CO_2$ TEA laser employs a corona discharge preionization technique and improved mechanical construction to improve vibration resistance and shelf life and to decrease sensitivity to the form of the electrical input.

6 Claims, 6 Drawing Figures

SEALED-OFF CO$_2$ LASER

This application is a Continuation-In-Part of prior pending application Ser. No. 256,282 filed on Apr. 23, 1981, now abandoned.

DESCRIPTION

1. Technical Field

The field of the invention is that of a simple, rugged, sealed-off TEA CO$_2$ laser employing a corona discharge preionization technique.

2. Background Art

U.S. Pat. No. 4,207,540 issued to G. J. Ernst and an article "Construction and Performance Characteristics of a Rapid Discharge TEA C0$_2$ Laser" by Ernst and Boer appearing in *Optics Communications*, Vol. 27, No. 1, Oct. 1978, page 105, disclose a flowing-gas C0$_2$ laser employing a corona discharge preionization technique. This discharge technique employs an intense electric field to initiate a corona discharge within the laser bore, which discharge generates ultraviolet light that preionizes the gas in the main discharge region of the laser FIG. 2 of the article and FIG. 3 of the patent disclose pertinent construction details of this laser The invention disclosed and claimed in the patent is a combined system featuring a particular discharge circuit and a particular electrical connection to the electrode preionization system. In both these references, gas is continuously flowed through the active volume, thus producing an environment different from that of a sealed-off laser.

DISCLOSURE OF INVENTION

The invention relates to an improved corona preionized TEA C0$_2$ laser adapted for sealed-off performance and long shelf life in which the mechanical construction of the laser cavity is altered from the prior art so as to improve long sealed-off performance and to reduce the dependence of the prior art device on a particular electrical circuit.

BEST MODE FOR CARRYING OUT THE INVENTION

Figure 3:
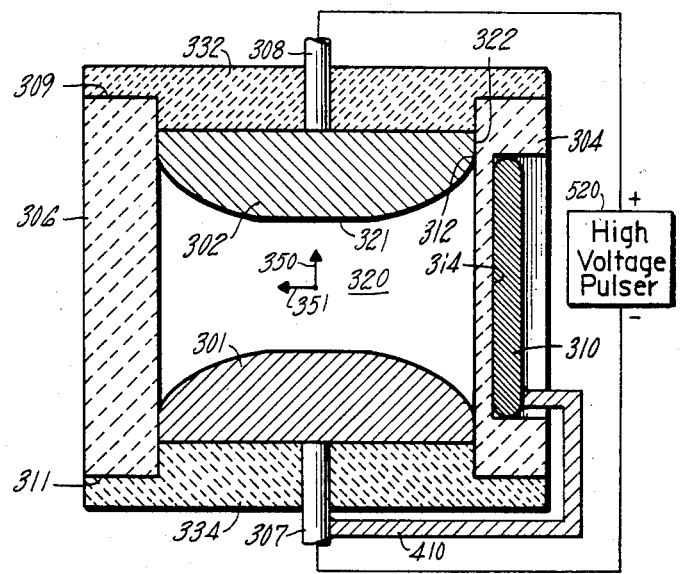
FIG. 3 is a cross section of a laser constructed according to the invention.

In FIG. 3, a cross-sectional view of a laser cavity constructed according to the subject invention is illustrated, in which volume 320 is the laser discharge cavity bounded by walls 306 and 304 on the sides and covers 332 and 334 on the top and bottom, respectively. The optical axis of the laser is perpendicular to the plane of the drawing and transverse axes 350 and 351 pass through covers 332, 334 and walls 304, 306, respectively. The walls and covers are illustratively composed of a dielectric substance such as MACOR, a machinable glass ceramic made by Corning Glass Works, and joints 309 and 311 between the walls and covers are hermetically sealed by glass frit bonding or an equivalent leak-proof technique. Within the enclosures so formed, electrodes 301 and 302 are respectively the cathode and anode of the laser exciting discharge. These electrodes are connected through covers 334 and 332 by connecting members 307 and 308, respectively, which members are shaped to have a low inductance and to facilitate a tight seal between the metallic conducting member and the cover. The joint between the connecting members and the covers is sealed by epoxy or by glass frit bonding. The shapes of electrodes 301 and 302 are contoured according to the procedure given by Chang, (see Ernst's patent, lines 54–56) in which the parameters are K=0.02, $v$=arc cos (−K) and the gap between electrodes 301 and 302 is illustratively 1 centimeter.

Within wall 304 of the laser cavity, there is machined an inset volume 314, to a depth such that the remaining wall thickness between electrode 302 and the inset is a critical value, illustratively 2 millimeters, the value of which will depend on the material selected for wall 304. Within this cavity 314, there is inserted electrode 310 which is electrically connected to the cathode electrode 301 by means of a low inductance lead 410. Electrode 310 is positioned within cavity 314 in such a manner that the top end of electrode 310 is in the vicinity of the break in the surface of electrode 302 between the curve surface 321 facing the cathode and the flat surface 322 which abuts the edge of wall 304. The break region 312 where these two surfaces meet is not sharp, but is rounded off with a radius of at least 0.003 inch. Electrode 310 is disposed parallel to transverse axis 350 such that the top edge of electrode 310 is substantially at the same height as the break region 312 of electrode 302 and the shortest distance between electrode 310 and electrode 302 passes through at least some of cavity region 320, not entirely through the wall 304. The result of this spacing is that the shortest distance and thus the strongest field is not within wall 304, which would tend to promote breakdown of the material comprising wall 304, but is rather partially within the C0$_2$ medium filling region 320. The intense electric field formed in the corner where surface 321 meets wall 304 pulls electrons off the material of wall 304 and generates a corona discharge which travels down the surface of wall 304 towards electrode 301, generating ultraviolet radiation as it does so. The ultraviolet radiation so generated travels throughout region 320, preionizing the gas.

Figure 4:
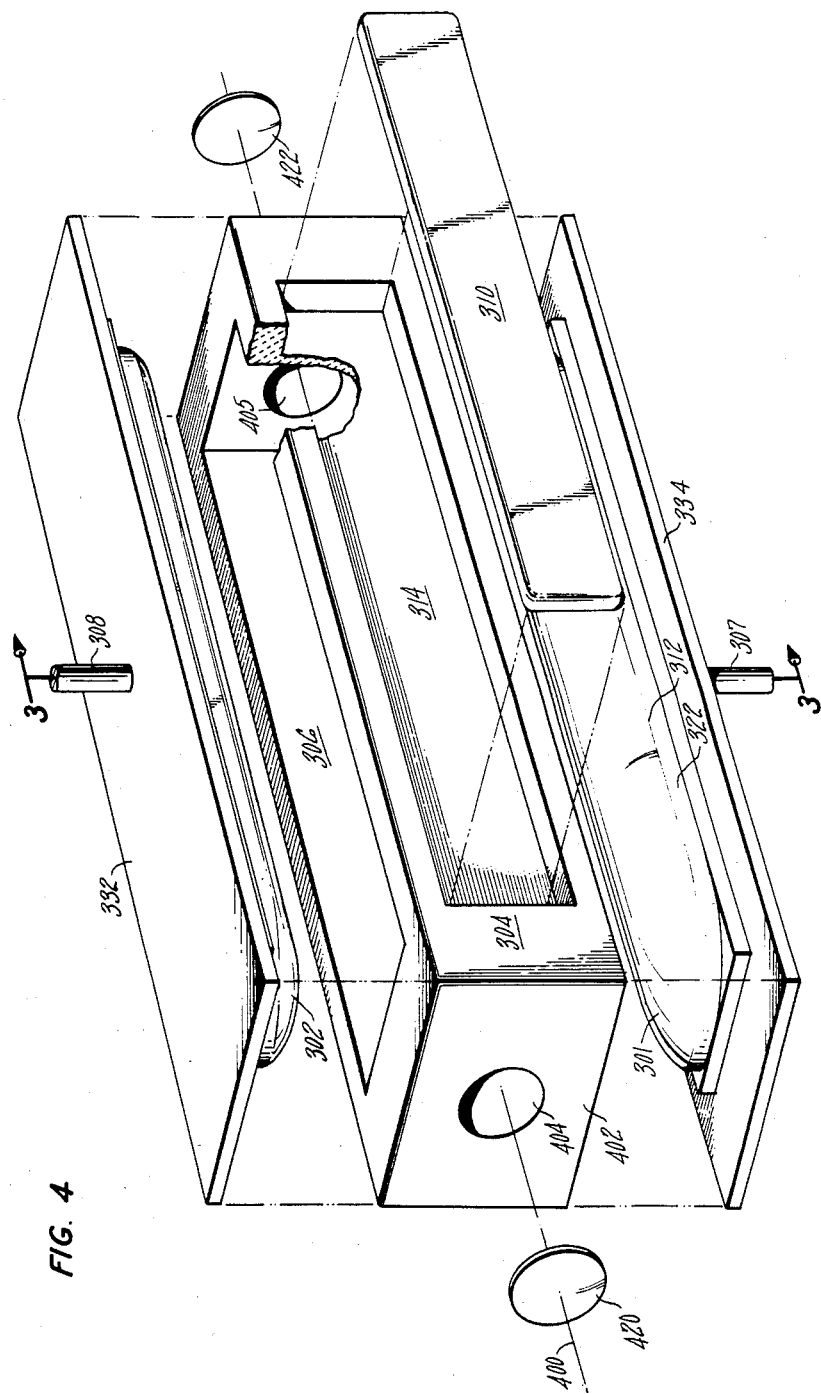
FIG. 4 is an exploded view of a laser constructed according to the invention.

FIG. 4 shows an embodiment of the invention in exploded form in which member 402 forms the walls and ends of the body of the laser cavity, the cavity being traversed by axis 400 which passes through lens 420, aperture 404, the main cavity, aperture 405 and lens 422. Lenses 420 and 422 are hermetically bonded to apertures 404 and 405 to maintain the lenses in alignment in a high vibration environment. The opposite faces of the body may be machined parallel and smooth by conventional machining techniques to align the lenses. In one side, 304, of body 402, there is machined an insert 314 which holds electrode 310. Electrode 310 is maintained in alignment by conventional fasteners, not shown. The top and bottom of body 402 are covered by covers 332 and 334, which are joined by glass frit bonding or another hermetic sealing technique. Electrodes 301 and 302 are fastened to their corresponding covers as shown in the cross section in FIG. 3, which is indicated by the arrows 3—3 in FIG. 4.

It is an advantageous feature of the invention that body 402 in FIG. 4 has only four seals, those on the top and bottom covers and on the lenses. If desired, one cover seal could be eliminated by casting the mold by means of hot isostatic pressing or equivalent technique, thus eliminating a joint near the stressed electrode (anode). It is another advantageous feature of the invention that a single material is used for the body of the laser, in contrast to the prior art in which a plurality of materials having dissimilar thermal characteristics were employed It is another advantageous feature of the invention that, while the direct path between electrode 302 and electrode 310 is necessarily short, in order to produce the required high field strength, the path outside the cavity between the connectors of electrodes 302 and 310 or their surfaces is quite long, thus eliminating a major difficulty of the prior art device.

Figure 1:
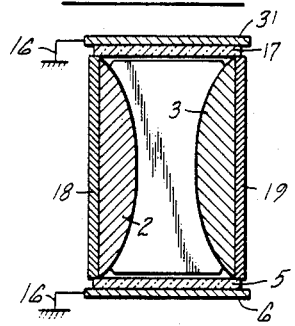
FIG. 1 illustrates a detail of the prior art laser from the above-mentioned paper.
Figure 2:
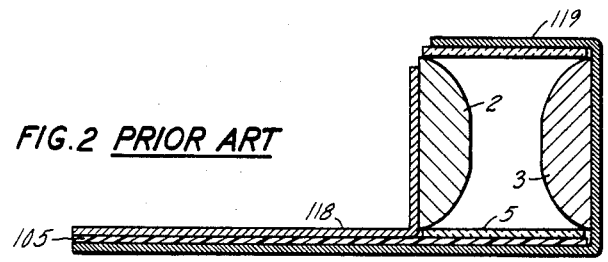
FIG. 2 is a reproduction of FIG. 3 from the above-mentioned patent.

In contrast, a device constructed according to the teachings of the prior art, is shown in FIGS. 1 and 2, in which the cavity of FIG. 1 is formed by members 18, 17, 19 and 5, two of which are brass and two of which are glass, thus producing four joints between dissimilar materials. A further difficulty of the prior art device is that there is a short, direct path between ground electrode 31 and brass member 18, which is in electrical contact with anode 2. A device was constructed according to these teachings and was plagued by a series of electrical short circuits between the extra-cavity electrode and the anode. In FIG. 2, electrodes 118 and 119, which are in electrical contact with anode and cathode 2 and 3, travel for a long distance with minimal separation maintained by insulating medium 105. According to the teachings of the prior art, this arrangement resulted in a very low inductance rise time of their Marx generator, a feature of the prior art system, which was an integrated laboratory instrument designed for the fastest rise time (about 15 nanoseconds).

The present invention makes use of the same physical principle of dielectric induced corona discharge to devise a portable field instrument designed to tolerate adverse conditions of vibration and thermal expansion and to be insensitive to variations in electrical parameters. A laser constructed according to the present invention has a voltage pulse rise time of more than 30 nanoseconds and a pulse voltage of more than 18 kilovolts for an electrode spacing of 1 centimeter.

A variation of the invention has a second electrode, similar to electrode 310, inset into wall 306, for greater uniformity of preionization and redundant operation for greater reliability. Another variation of the invention is the combination of the end pieces and covers 332, 334 to form a single unit. Yet another variation is the combination of the sides 304, 306 and covers 332, 334 to form a single unit.

Figure 5:
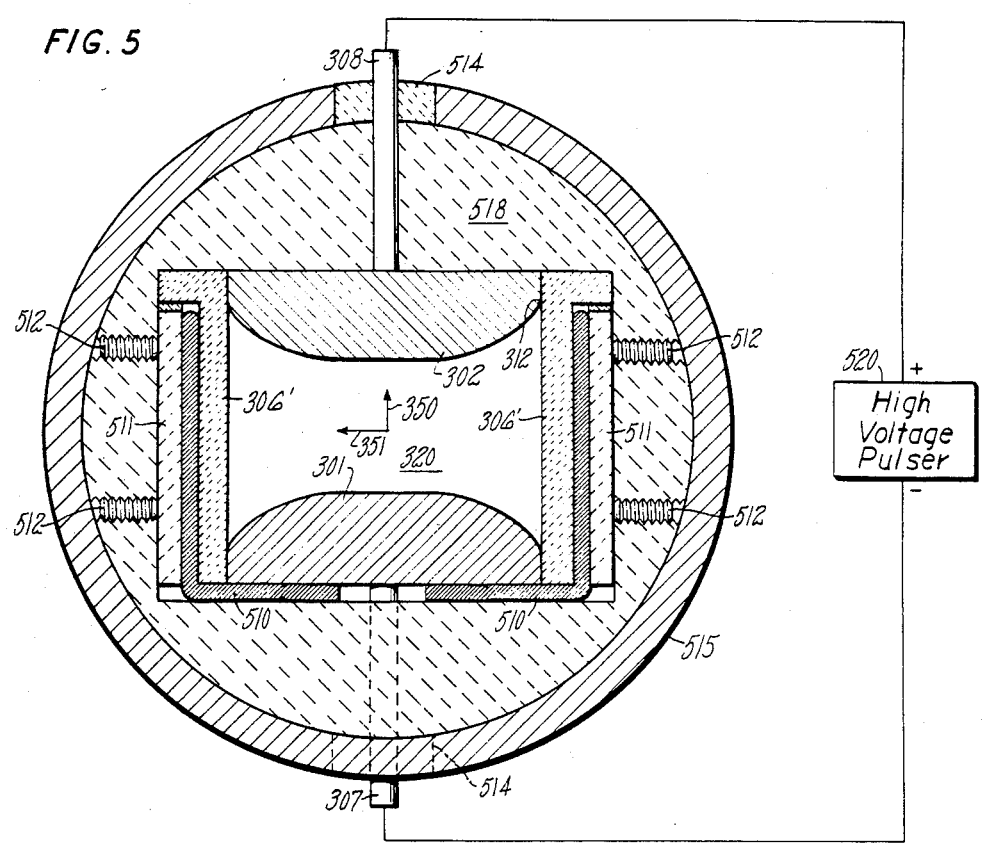
FIG. 5 illustrates a cross section of an alternate embodiment of the invention.

FIG. 5 illustrates in cross section an alternative embodiment of the invention in which the sealed-off enclosure is formed from a tube 515, which may be a dielectric such as an aluminum oxide or a conducting material structure such an an aluminum pipe or any other convenient form. Current from a high voltage pulser 520 passes through electrically conducting members 307 and 308 connected respectively to electrodes 301 and 302 within the cavity. Conductors 307 and 308 pass through insulating members 514 in the case where the tube is a conductor. The electrode assembly and sidewalls are positioned within tube 515 by being locked in two disc elements 518 by set screws 512 as shown in FIG. 5. Elements 518 are formed by machining or any other conventional process to have an outer diameter that fits snugly within tube 515 and an inner shape that holds the electrode and sidewall assembly by pressure from set screws 512. Symmetric insulating members 306' extend between electrodes 301 and 302 and are offset from the axis of the cavity by a certain offset distance along axis 351. Low inductance leads 510 extend from cathode 301 along the outside of members 306', extending parallel to transverse axis 350 by an offset distance parallel to axis 351 from the optic axis of the discharge region up to a point near break region 312. As in the previous embodiment, the top of lead 510 extends to a point slightly below break region 312 so that a straight line in a plane parallel to transverse axis 351 and perpendicular to transverse axis 350 extends through insulating member 306' and through a portion of the discharge gas which fills discharge region 320 until it meets electrode 302.

Members 306' need not confine the gas which may circulate freely within the interior of tube 515, thus providing a gas reservoir. Members 306' need not extend perpendicular to the plane of the paper the full length of electrodes 301 and 302, although it is preferred for the greatest uniformity in exciting the discharge that they do cover the whole discharge region.

It is preferred to have the minimum number of vacuum seals in order to prevent leakage through the sealed-off enclosure. A preferred embodiment uses two elements 518 spaced symmetrically within the sealed-off enclosure. The cross section in FIG. 5 is taken through one element 518, showing the electrode 308 that forms the electrical connection through upper insulator 514. Electrode 307 makes contact with the second element 518 that is positioned behind the plane of the paper, so that electrode 307 and its insulator 514 are shown by dotted lines. The exterior view of electrode 308 is shown in perspective in FIG. 6.

Figure 6:
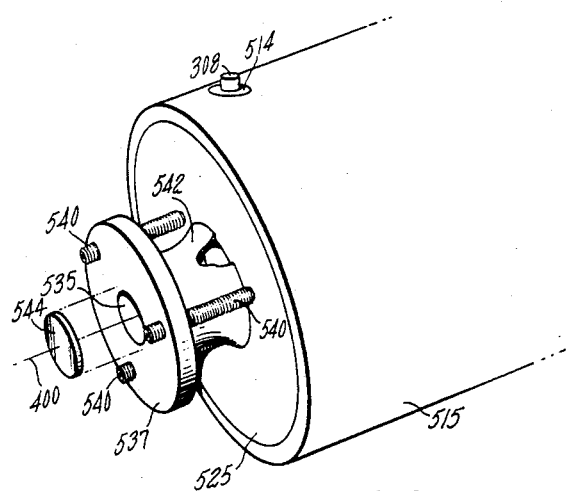
FIG. 6 illustrates a detail of the embodiment of FIG. 5.

FIG. 6 shows in perspective an end of tube 515 with end plate 525 covering the end and sealed, illustratively by a vacuum braze to tube 515 with a suitable low temperature solder. Electron beam welding could also be used. Curved member 542, which may be formed from stainless steel, aluminum, or any other convenient material forms an interface between end plate 525 and adjustable plate 537. The tilt of plate 537 may be adjusted by set screws 540. Optic axis 400 is the optic axis of the laser and extends through aperture 535 in plate 537; through a corresponding aperture in plate 525 which is not shown; and along the discharge region between electrodes 301 and 302 to a symmetric end plate on the opposite end of the laser which is not shown. Mirror 544 is fastened to plate 537 by conventional cold soldering or by cementing and defines one end of the optical cavity. The other end of teh optical cavity is, of course, defined by a symmetric mirror 544. The ends of a cavity need not be bounded by mirrors, of course, and gratings, etalons or other conventional devices may be used.

I claim:

1. A TEA $CO_2$ laser having a $CO_2$ laser gain medium and bounded by a sealed-off enclosure having an optic axis and a traverse axis and having first and second end members disposed perpendicular to said optic axis, first and second side members and first and second cover members, said side members and cover members being disposed parallel to said optic axis and together surrounding said axis, all of said members being formed from the same material;

said laser further including reflective optical elements disposed along said optic axis and defining an optical cavity therebetween for resonating optical radiation within said gain medium;

including anode and cathode electrodes disposed on opposite sides of the interior of said enclosure parallel with said optic axis and a predetermined electrode distance along said transverse axis and being separated by said side members, said anode electrode having a curved surface facing said cathode electrode and planar wall surfaces abutting said side members, said curved surface and said planar wall surfaces meeting in a transition area having a radius of curvature of at least 0.003 inches;

said laser further including at least one extra-cavity electrode electrically connected to said cathode electrode by means of a low-inductance lead and being mounted along the outer surface of one of said side members overlapping said anode electrode along said transverse axis in such a manner that the shortest straight line between said anode and said extra-cavity electrode in a plane perpendicular to said transverse axis passes through a portion of said laser medium and also through a layer of insulating material in the form of a portion of said enclosure wall; and means for applying pulsed high voltage to said anode and cathode electrodes, said voltage having a rise time of at least 30 nanoseconds and a peak value such that a field of at least 18 kv/cm is produced between said anode and cathode electrodes, whereby a corona discharge is formed between said anode and said extra-cavity electrode which pre-ionizes the $CO_2$ medium between said anode and cathode electrodes.

2. A laser according to claim 1, in which said end members and said side members form a continuous single member.

3. A laser according to claim 1, in which said end members and said cover members form a continuous single member.

4. A laser according to claim 1, in which said side members and said cover members form a continuous single member.

5. A laser according to any of claims 1, 2, 3 or 4, in which said sealed-off enclosure extends continuously between said extra-cavity electrode and said anode and along said planar wall surface.

6. A TEA $CO_2$ laser having a $CO_2$ laser gain medium and bounded by a sealed-off enclosure having an optic axis and a transverse axis and having first and second end members disposed perpendicular to said optic axis, said end members being connected by a substantially tubular wall member disposed parallel to and surrounding said optic axis, said end members and said tubular wall member being sealed together to form said sealed-off enclosure;

said laser further including reflective optical elements disposed along said optical axis and defining an optical cavity therebetween for resonating optical radiation within said gain medium;

including anode and cathode electrodes disposed on opposite sides of the interior of said enclosure parallel with said optic axis and a predetermined electrode distance along said transverse axis and being separated by spacing side members said anode electrode having a curved surface facing said cathode electrode and planar wall surfaces abutting said side members, said curved surface and said planar wall surfaces meeting in a transition area having a radius of curvature of at least 0.003 inch;

said laser further including at least one extra-cavity electrode electrically connected to said cathode electrode by means of a low-inductance lead and being mounted along the outer surface of one of said side members overlapping said anode electrode along said transverse axis in such a manner that the shortest straight line between said anode and said extra-cavity electrode in a plane perpendicular to said transverse axis passes through a portion of said laser medium and also through a layer of insulating material in the form of a portion of said enclosure wall; and means for applying pulsed high voltage to said anode and cathode electrodes, said voltage having a rise time of at least 30 nanoseconds and a peak value such that a field of at least 18 kv/cm is produced between said anode and cathode electrodes, whereby a corona discharge is formed between said anode and said extra-cavity electrode which preionizes the $CO_2$ medium between said anode and cathode electrodes.

* * * * *